(12) United States Patent
Yang et al.

(10) Patent No.: US 10,456,909 B2
(45) Date of Patent: Oct. 29, 2019

(54) MULTI-JOINT INDUSTRIAL ROBOT-BISPIR

(71) Applicants: Foshan Huashu Robotics Co., Ltd., Foshan, Guangdong Province (CN); Foshan Institute of Intelligent Equipment Technology, Foshan, Guangdong Province (CN)

(72) Inventors: Lin Yang, Foshan (CN); Xugao Deng, Foshan (CN); Jiangtao Hu, Foshan (CN); Qirong Chen, Foshan (CN); Xing Zhou, Foshan (CN); Qun Wang, Foshan (CN); Haibin Yang, Foshan (CN)

(73) Assignees: Foshan Huashu Robotics Co., Ltd., Foshan (CN); Foshan Institute of Intelligent Equipment Technology, Foshan (CN)

( * ) Notice: Subject to any disclaimer, the term of this patent is extended or adjusted under 35 U.S.C. 154(b) by 0 days.

(21) Appl. No.: 15/885,000

(22) Filed: Jan. 31, 2018

(65) Prior Publication Data
US 2018/0345486 A1 Dec. 6, 2018

(30) Foreign Application Priority Data

Jun. 2, 2017 (CN) .......................... 2017 1 0408595
Aug. 25, 2017 (CN) .......................... 2017 1 0743912

(51) Int. Cl.
| | | |
|---|---|---|
| *B25J 17/00* | (2006.01) | |
| *B25J 17/02* | (2006.01) | |
| *B25J 18/00* | (2006.01) | |
| *B25J 9/04* | (2006.01) | |
| *B25J 9/08* | (2006.01) | |
| *B25J 9/06* | (2006.01) | |
| *B25J 9/00* | (2006.01) | |

(52) U.S. Cl.
CPC ............. *B25J 9/043* (2013.01); *B25J 9/0024* (2013.01); *B25J 9/06* (2013.01); *B25J 9/08* (2013.01); *B25J 17/02* (2013.01)

(58) Field of Classification Search
CPC ......... B25J 9/047; B25J 17/02; B25J 19/0025
See application file for complete search history.

(56) References Cited

U.S. PATENT DOCUMENTS

| | | | |
|---|---|---|---|
| 6,250,174 B1 * | 6/2001 | Terada ..................... | B25J 9/047 414/918 |
| 8,347,753 B2 * | 1/2013 | Larsson ............... | B25J 19/0029 74/490.01 |

* cited by examiner

*Primary Examiner* — Jake Cook
(74) *Attorney, Agent, or Firm* — Millen, White, Zelano & Branigan, P.C.; William Nixon

(57) ABSTRACT

A bi-spin multi joint robot comprises an upper arm, a lower arm protruding forward and a wrist. The lower arm, which connects to the upper arm, is located at the right side of the upper arm. The wrist, which connects to the lower arm, is located at the right side of the tail end of the lower arm. In detail, the lower arm not only connects to the upper arm through the first transverse spindle but also connects to the wrist through the second transverse spindle. The upper arm is provided with a clearance space at the right side in order to enable the lower arm to rotate around the first transverse spindle in the clearance space, the first transverse spindle is assembled at the tail end of the upper arm, and the second transverse spindle is assembled at the tail end of the lower arm.

7 Claims, 5 Drawing Sheets

MULTI-JOINT INDUSTRIAL ROBOT-BISPIR

FIELD OF THE INVENTION

The invention relates to a bi-spin robot, abbreviated to Bispir.

BACKGROUND OF THE INVENTION

As machines are commonly cheaper to replace people, industrial robots are usually used to produce productions in industrial manufacturing and other related technical fields. Most multi joint industrial robots in the current market are ordinary 6-DOF (six-joint) robots. However, with increasingly higher requirements on the production efficiency in industry, it is urgently necessary to increase the operation speed of the robot without increasing the energy consumption, so as to maximize the economic benefits.

Based on this background, it needs to invent a new robot for meeting the requirement of small operation space. The application environment requires such robot which has lower occupation area and quick movement speed and the transportation of the target between the front and rear position does not occupy additional avoidance space. However, the traditional 6-DOF robot is useless in such condition. The bi-spin robot breaks the structure form of the traditional general robot, and provides a 6-DOF robot with a creative structure, so that the robot can not only own the functions of generally 6-DOF robot which only has external rotation function but also realize the internal rotation. In detail, the function called "external rotation" means that when the robot executes external rotation, the upper arm usually rotates about one axis and the trajectory of the end effector is an arc. However, the function called "internal rotation" means that when the robot executes internal rotation, the lower arm will cut across the interior space close to the upper arm instead of occupying external space. Therefore it is called a bi-spin robot. This kind of robot can greatly reduce the space required for installing and the inertia in the operation process, and results in greatly increased operation speed and reduced operation time.

Moreover, there are a lot of 6-DOF robots in the current market. The former three joints of various 6-DOF robots are similar, while the last three joints of various 6-DOF robots mainly have two different kinds of structure, wherein the first type has a postpositional joint, which is represented by KUKA, the second type has a prepositional joint, which is represented by FUNAC, Yaskawa, etc., and all the motors are horizontally installed. The volume of the arm of the second type of robot depends on the length of the motor, so that the weight of most manipulators is very heavy, which causes larger weight of the robot.

In addition, the 6-DOF robot is frequently used in the industry. As to the existing 6-DOF robot, the fifth motor is directly connected to a wrist. Since the weight of the fifth motor is large, the rotational inertia can be very large and consume a lot of energy, which is harmful to energy conservation and environment protection. Moreover, the existing wrist movement inertia is also very large, and all these factors can lead to inflexible movement and large energy consumption for the robot.

SUMMARY OF THE INVENTION

The technical problem can be solved by providing a bi-spin robot (abbreviated to Bispir).
The solution to the technical problems is as follows.

A bi-spin robot comprises an upper arm, a lower arm protruding forward and a wrist. The lower arm, which connects to the upper arm, is located at the right side of the upper arm. The wrist, which connects to the lower arm, is located at the right side of the tail end of the lower arm. In detail, the lower arm not only connects to the upper arm through the first transverse spindle but also connects to the wrist through the second transverse spindle. The upper arm is provided with a clearance space at the right side, so that the lower arm can rotate around the first transverse spindle in the clearance space, the first transverse spindle is fixed at the tail end of the upper arm, and the second transverse spindle is fixed at the tail end of the lower arm.

As a further improvement to the technical solution above, the bi-spin robot further comprises a fifth motor assembled at the front end of the lower arm. An output axis of the fifth motor protrudes forward and the wrist is assembled at the right side of the lower arm. The output axis of the fifth motor is connected to the wrist through a bevel gear set and the bevel gear set comprises the first bevel gear connected to the output axis of the fifth motor. The second bevel gear connects to the wrist and the first bevel gear connects to the second bevel gear. The spindle of the second bevel gear is the second transverse spindle.

As a further improvement to the technical solution above, the bi-spin robot further comprises a fourth motor and an arm wire jacket. The fourth motor is assembled at the left side of the tail end of the upper arm. The output axis of the fourth motor protrudes to the right side and is connected to the lower arm assembled at the right side of the upper arm. The arm wire jacket is assembled at the left side of the upper arm and the arm wire jacket strides over the lower arm and the upper arm, so that the other endpoint of the arm wire jacket can be assembled at the right side of the upper arm. The upper arm is provided with a hole at the right side, so that one end of the arm wire jacket originally connected to the right side of the upper arm can be connected to the hole, and the output axis of the fourth motor is the first transverse spindle.

As a further improvement to the technical solution above, the arm wire jacket comprises a front section and a back section and the front section is arranged at the right side of the lower arm. The initial end of the front section is fixed on the lower arm, the tail end of the front section is fixed on the back end of the lower arm. The initial end of the back section is fixed on the back end of the lower arm, and the tail end of the back section is fixed on the right side of the upper arm.

As a further improvement to the technical solution above, the bi-spin robot further comprises a fifth motor and a wrist. The fifth motor is assembled on the front end of the lower arm and the output axis of the fifth motor protrudes forward. The wrist is assembled at the right side of the lower arm, and an output axis of the fifth motor is connected to the wrist through a bevel gear set.

As a further improvement to the technical solution above, the bi-spin robot further comprises a pedestal component, wherein the pedestal component connects to the upper arm through a third transverse spindle. The third transverse spindle is assembled on the pedestal component. And the pedestal component, the upper arm, the lower arm and the wrist are assembled in sequence from left to right.

As a further improvement to the technical solution above, the bi-spin robot further comprises a base component, wherein the base component is provided with a first longitudinal spindle, and the first longitudinal spindle is connected to the pedestal component.

The robot has the beneficial effects that the bi-spin robot comprises the upper arm, the lower arm protruding forward and the wrist. The lower arm, which connects to the upper arm, is located at the right side of the upper arm. The wrist, which connects to the lower arm, is located at the right side of the tail end of the lower arm. In detail, the lower arm not only connects to the upper arm through the first transverse spindle but also connects to the wrist through the second transverse spindle. The upper arm provides a clearance space at the right side in order to enable the lower arm to rotate around the first transverse spindle in the clearance space. The first transverse spindle is assembled at the tail end of the upper arm, and the second transverse spindle is assembled at the tail end of the lower arm. The upper arm, the lower arm and the wrist are assembled in sequence from left to right, so that the lower arm can downwardly rotate to go across the clearance space when the upper arm is under a vertical status; in this way, the lower arm has flexible movement, lower inertia and quick movement. The disclosure is used as a multi joint robot.

BRIEF DESCRIPTION OF THE DRAWINGS

In order to describe the technical solution in the embodiments more clearly, the drawings used in the embodiment description will be simply described hereinafter. Apparently, the described drawings relate to only a part of embodiments of the disclosure instead of all the embodiments, and those skilled in the art can also obtain other design solutions and drawings according to the drawings without going through any creative works.

DETAILED DESCRIPTION OF THE EMBODIMENTS

Figure 1:
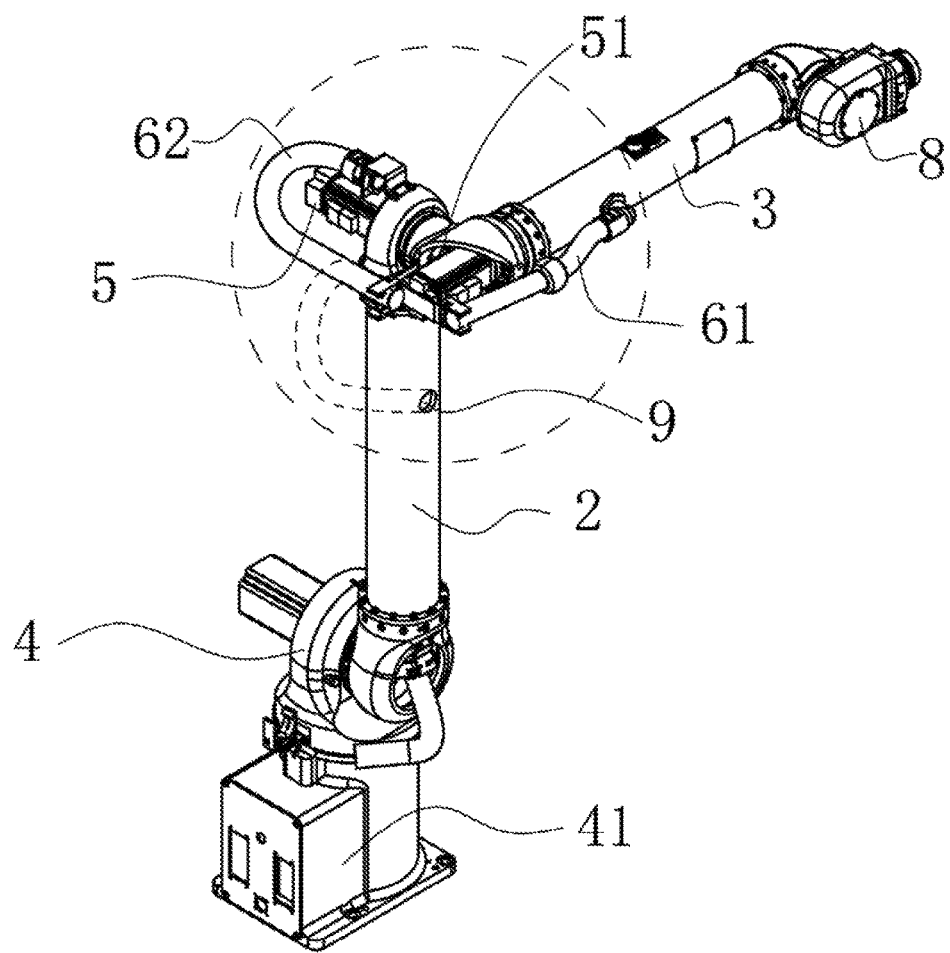
FIG. 1 is a three-dimensional schematic diagram of an embodiment of the disclosure.
Figure 2:
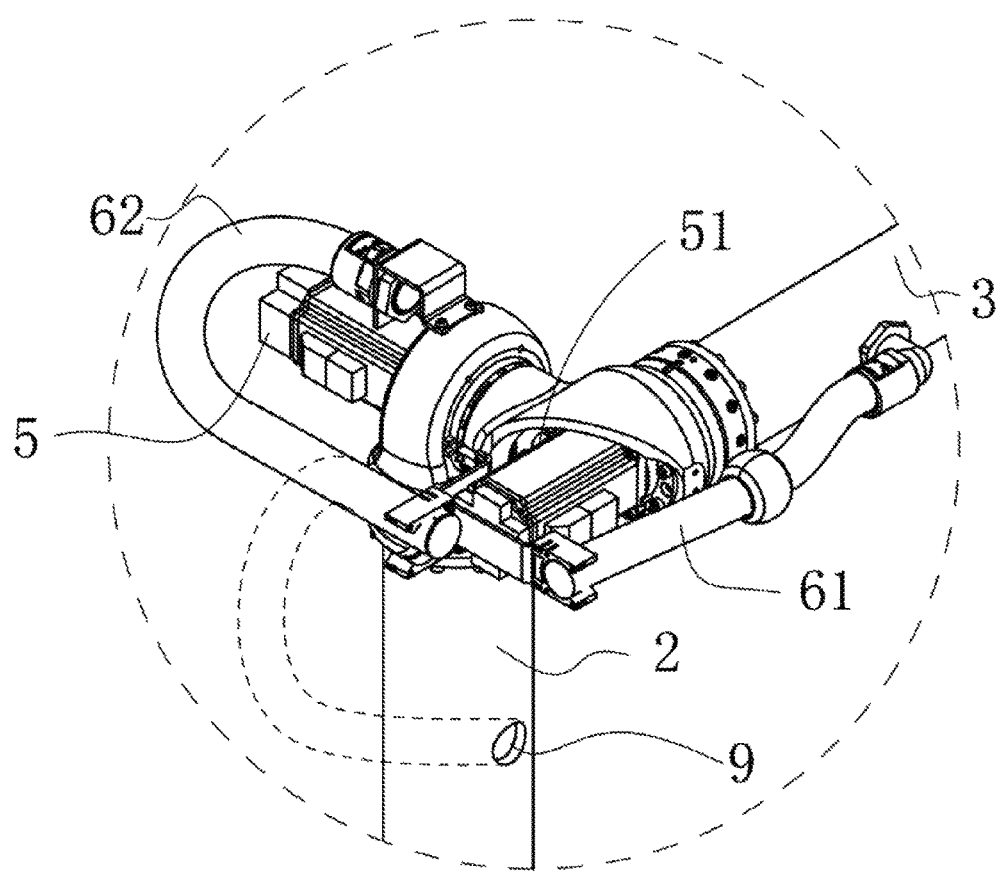
FIG. 2 is a partially enlarged schematic diagram of FIG. 1.
Figure 3:
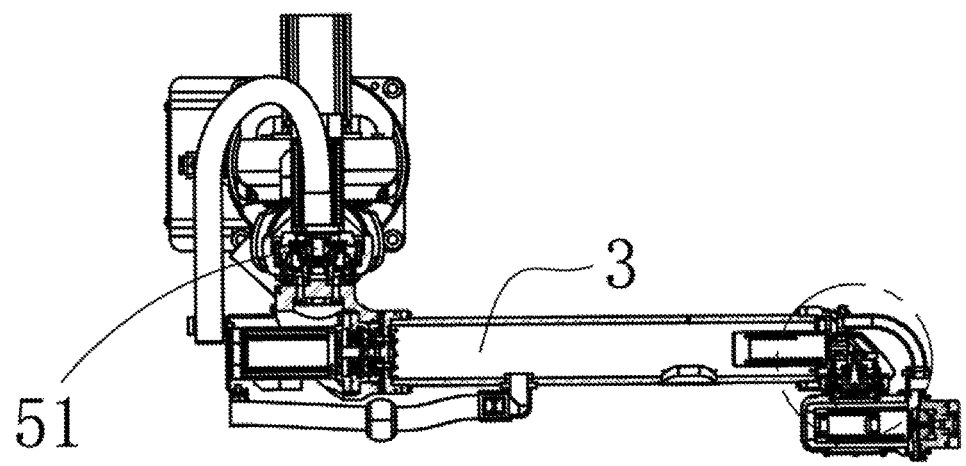
FIG. 3 is a top-view structure schematic diagram of the embodiment of the disclosure.
Figure 4:
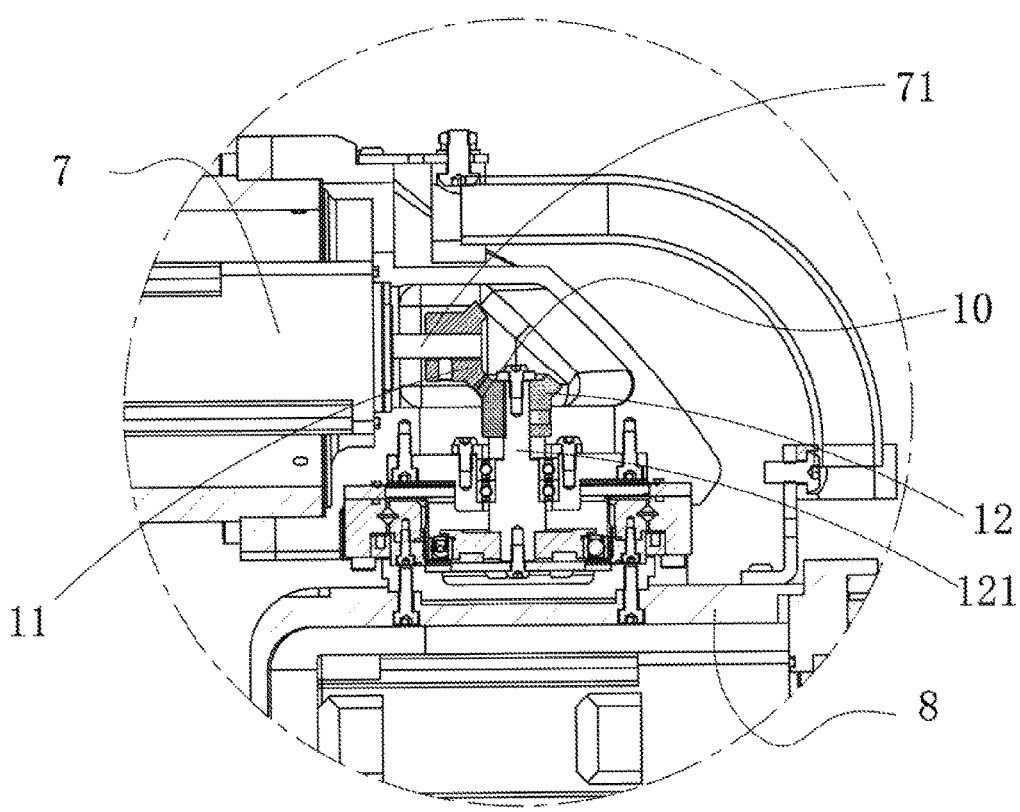
FIG. 4 is a partially enlarged schematic diagram of FIG. 3.

The concept, specific structure and generated technical effects of the disclosure are clearly and completely described with reference to the embodiments and the drawings to fully understand the objects, solutions and effects of the disclosure. Apparently, the described embodiments are only partial embodiments of the disclosure instead of all the embodiments, and other embodiments obtained by those skilled in the art based on the embodiments of the disclosure without going through any creative work shall all fall within the protection scope of the disclosure. In addition, all linkage/connection relations mentioned in the text indicate preferable linkage relation formed through adding or reducing a linkage accessory instead of singly indicating the direct connection of components. All technical features in the disclosure can be combined with each other in case of no conflicts.

FIG. 1 to FIG. 4 show the embodiments of the disclosure, which are specifically described as follows.

A bi-spin robot comprises an upper arm 2, a lower arm 3 protruding forward and a wrist 8. The lower arm 3, which connects to the upper arm 2, is located at the right side of the upper arm 2. The wrist 8, which connects to the lower arm 3, is located at the right side of the tail end of the lower arm 3. In detail, the lower arm 3 not only connects to the upper arm 2 through the first transverse spindle 51 but also connects to the wrist 8 through the second transverse spindle 121. The upper arm 2 is provided with a clearance space at the right side, so that the lower arm 3 can rotate around the first transverse spindle 51 in the clearance space, the first transverse spindle 51 is assembled at the tail end of the upper arm 2, and the second transverse spindle 121 is assembled at the tail end of the lower arm 3. The upper arm, the lower arm and the wrist are assembled in sequence from left to right, so that the lower arm can downwardly rotate to go across the clearance space when the upper arm is under a vertical status; in this way, the lower arm has lower inertia and is flexible and quick in movement.

The disclosure further comprises a fifth motor 7, wherein the fifth motor 7 is assembled at the front end of the lower arm 3, an output axis 71 of the fifth motor 7 protrudes forward, the wrist 8 is assembled at the right side of the lower arm 3. And the output axis 71 of the fifth motor 7 is connected to the wrist 8 through a bevel gear set 10, then the bevel gear set 10 comprises a first bevel gear 11 connected to the output axis 71 of the fifth motor 7 and a second bevel gear 12 connected to the wrist 8. The first bevel gear 11 is meshed with the second bevel gear 12, and a spindle 121 of the second bevel gear 12 is the second transverse spindle 121. In this way, the output axis can be set to be very long so that the center of gravity of the fifth motor is deviated backward. Even if the output axis is not set to be very long, since the fifth motor is set front and back, the center of gravity of the fifth motor cannot be at the front end of the lower arm either, so as to reduce the movement inertia of the lower arm.

The disclosure further comprises a fourth motor 5 and a first arm wire jacket 62, wherein the fourth motor 5 is assembled at the left side of the tail end of the upper arm 2, an output axis 51 of the fourth motor 5 protrudes to the right side and is connected to the lower arm 3 assembled at the right side of the upper arm 2. One end of the first arm wire jacket 62 is assembled at the left side of the upper arm 2, the first arm wire jacket 62 strides over the lower arm 3 and the upper arm 2, so that the other end of the first arm wire jacket 62 can be assembled at the right side of the lower arm 2. The upper arm is provided with a hole 9 at the right side, so that one end of the first arm wire jacket 62 originally connected to the right side of the upper arm 2 can be connected to the hole 9, and the output axis of the fourth motor 5 is the first transverse spindle. In this way, the upper arm can swing downward, the energy consumed in the process of swinging 180 degrees is little, the inertia of this movement is lower, and the movement of the robot can be very flexible. The upper arm is provided with the hole 9 at the right side, so that one end of the first arm wire jacket 62 originally connected to the right side of the upper arm 2 can be connected to the hole 9, so as to realize the variability of the joint movement.

The disclosure further comprises a second arm jacket 61. The second arm jacket 61 is assembled at the right side of the lower arm 3 and the initial end of the second arm jacket 61 is fixed on the lower arm 3. The tail end of the second arm jacket 61 is fixed on the back end of the lower arm 3, the initial end of the first arm jacket 62 is fixed on the back end of the lower arm 3, and the tail end of the back section 2 is fixed on the right side of the upper arm 2. In this way, the upper arm cannot intervene with the arm wire jacket in the rotation process, and the movement arm wire jacket can be reduced further.

The disclosure further comprises a pedestal component 4, wherein the pedestal component 4 is connected to the upper arm 2 through a third transverse spindle. The third transverse spindle is assembled on the pedestal component 4, and the pedestal component 4, the upper arm 2, the lower arm 3 and the wrist 8 are assembled in sequence from left to right. In this way, the clearance space can be extended to the right side of the pedestal component 4 to prevent the interference of the lower arm 3, the wrist 8 and the pedestal component 4.

The disclosure further comprises a base component 41, wherein the base component 41 is provided with a first longitudinal spindle, and the first longitudinal spindle is connected to the pedestal component 4.

The first transverse spindle, the second transverse spindle and the third transverse spindle are mutually parallel, and the third transverse spindle is mutually vertical to the first longitudinal spindle.

Figure 5:
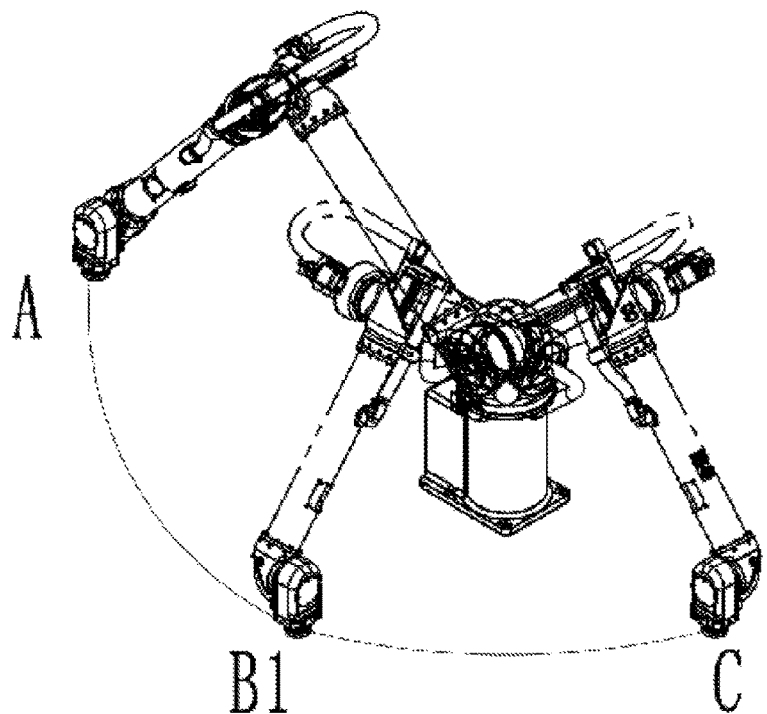
FIG. 5 is a track schematic diagram of the embodiment of the disclosure during internal rotation.
Figure 6:
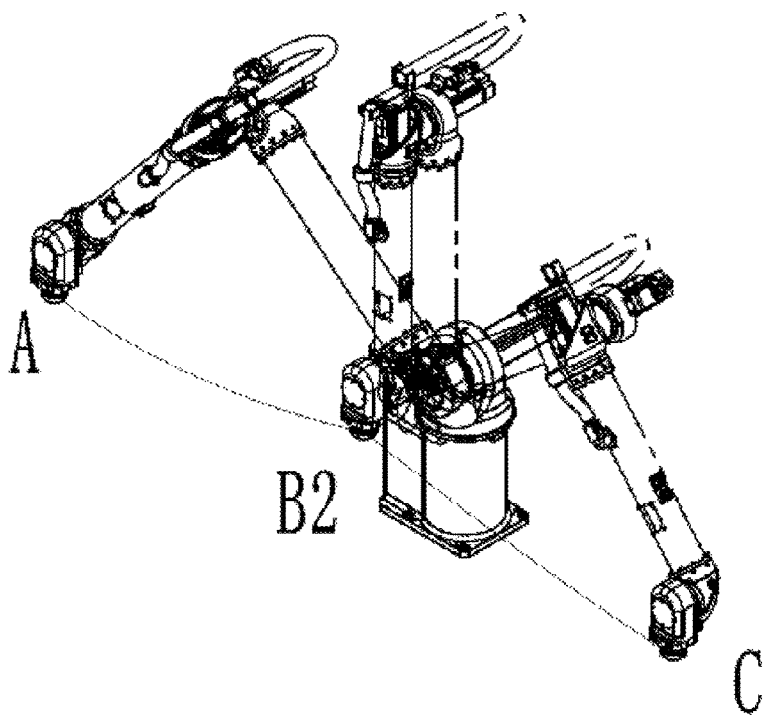
FIG. 6 is a track schematic diagram of the embodiment of the disclosure during external rotation.

As shown in FIG. 5 and FIG. 6, the pedestal component 4, the upper arm 2, the lower arm 3 and the wrist 8 are assembled in sequence from left to right, which can realize the deviation of the upper arm 2, the lower arm 3 and the wrist 8 of each robot, so that the robot can not only go through position B1 from position A and reach position C via the rotation of the first spindle, which is called external rotation function, but also go through position B2 from position A and reach position C, so that the robot directly moves behind the robot from the front of the robot through the internal rotation, which is called the internal rotation function; therefore, the robot has two rotation methods to realize the same movement. Wherein, the robot can reach the minimum inertia, most energy-saving feature, and fastest speed in movement process, so that the movement of the robot can be very flexible. The robot has the internal rotation function to enable the tail end of the robot to move behind the robot from the front of the robot.

The contents above specifically describe the preferred embodiments of the disclosure, but the disclosure is not limited to the embodiments. Those skilled in the art may make various equal deformations or replacements on the premise of not violating the spirit of the disclosure, and these equal deformations or replacements shall fall within the scope limited by the claims of the application.

The invention claimed is:

1. A Multi-joint Industrial Robot, comprising
    an upper arm (2) having a first end and a second end opposite the first end;
    a first motor (5) arranged at the second end of the upper arm (2) and having a first output shaft (51);
    a lower arm (3) having a third end rotationally connected to the second end of the upper arm (2) through the first output shaft (51) and a fourth end opposite the third end; and
    a wrist (8), rotationally connected to the fourth end of the lower arm (3) through a transverse spindle (121), wherein the upper arm (2) and the wrist (8) are arranged on opposite sides of the lower arm (3) along an axial direction of the first output shaft (51); and
    a first arm wire jacket (62) having a fifth end arranged at a first side of the upper arm (2) where the lower arm (3) rotates, and a sixth end connected to a second side of the upper arm (2) opposite the first side so that the first arm wire jacket (62) strides over the lower arm (3) and the upper arm (2) or is connected to a hole (9) arranged at the first side of the upper arm (2).

2. The Multi-joint Industrial Robot according to claim 1, further comprising a second motor (7), wherein the second motor (7) is assembled at the fourth end of the lower arm (3), a second output shaft (71) of the second motor (7) is connected to the wrist (8) through a bevel gear set (10), the bevel gear set (10) comprises a first bevel gear (11) connected to the second output shaft (71) of the second motor (7) and a second bevel gear (12) connected to the wrist (8), the first bevel gear (11) is meshed with the second bevel gear (12), and a spindle (121) of the second bevel gear (12) is the transverse spindle (121).

3. The Multi-joint Industrial Robot according to claim 1, further comprising a second motor (7), wherein the second motor (7) is assembled on the fourth end of the lower arm (3), and a second output shaft (71) of the second motor (7) is connected to the wrist (8) through a bevel gear set (10).

4. The Multi-joint Industrial Robot according to claim 1, further comprising a pedestal component (4), wherein the pedestal component (4) is rotationally connected to the upper arm (2).

5. The Multi-joint Industrial Robot according to claim 4, further comprising a base component (41), wherein the base component (41) is rotationally connected to the pedestal component (4).

6. The Multi-joint Industrial Robot according to claim 1, further comprising a second arm wire jacket (61) having a seventh end fixed on the lower arm (3) and an eighth end fixed on the third end of the lower arm (3).

7. The Multi-joint Industrial Robot according to claim 6, further comprising a second motor (7), wherein the second motor (7) is assembled on the fourth end of the lower arm (3), and a second output shaft (71) of the second motor (7) is connected to the wrist (8) through a bevel gear set (10).

* * * * *